US009258494B2

(12) United States Patent
Baylouny et al.

(10) Patent No.: US 9,258,494 B2
(45) Date of Patent: Feb. 9, 2016

(54) METHOD AND SYSTEM FOR RESTRICTING APPLICATIONS FOR A FOCAL PLANE ARRAY

(71) Applicant: DRS Network & Imaging Systems, LLC, Melbourne, FL (US)

(72) Inventors: John A. Baylouny, Dallas, TX (US); Scott Miskimins, Dallas, TX (US); Gregory Christison, Dallas, TX (US); Kevin Macauley, Dallas, TX (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 295 days.

(21) Appl. No.: 13/848,439

(22) Filed: Mar. 21, 2013

(65) Prior Publication Data

US 2013/0286215 A1    Oct. 31, 2013

Related U.S. Application Data

(60) Provisional application No. 61/616,612, filed on Mar. 28, 2012, provisional application No. 61/616,606, filed on Mar. 28, 2012.

(51) Int. Cl.
*H04N 5/33* (2006.01)
*H04N 5/232* (2006.01)

(52) U.S. Cl.
CPC ............. *H04N 5/33* (2013.01); *H04N 5/23241* (2013.01)

(58) Field of Classification Search
None
See application file for complete search history.

(56) References Cited

U.S. PATENT DOCUMENTS

| 4,326,755 A * | 4/1982 | Fretz, III | B64C 25/426 244/111 |
| 5,815,407 A * | 9/1998 | Huffman | B64C 27/006 244/183 |
| 6,515,285 B1 * | 2/2003 | Marshall | G01J 5/20 250/339.03 |
| 7,977,634 B2 | 7/2011 | Thiele et al. | |
| 2008/0016744 A1 * | 1/2008 | Joannes | F41A 19/01 42/1.01 |

(Continued)

FOREIGN PATENT DOCUMENTS

| JP | 2006-201957 A | 8/2006 |
| WO | 2006-036464 | 4/2006 |
| WO | 2011-047977 A1 | 4/2011 |

OTHER PUBLICATIONS

International Preliminary Report on Patentability from PCT/US2013/034036 mailed on Oct. 9, 2014, 9 pages.
International Preliminary Report on Patentability from PCT/US2013/034100 mailed on Oct. 9, 2014, 9 pages.
International Search Report and Written Opinion of PCT/US2013/034036 mailed on Jan. 28, 2014, 24 pages.

(Continued)

*Primary Examiner* — Christopher S Kelley
*Assistant Examiner* — Kaitlin A Retallick
(74) *Attorney, Agent, or Firm* — Kilpatrick Townsend & Stockton LLP

(57) ABSTRACT

Systems and methods disclosed herein include preventing use of a Focal Plane Array ("FPA") in a thermal imaging system if used in conjunction with a weapons-related activity by disabling the FPA in response to detecting one or more shock pulse events using accelerometers coupled with the thermal imaging system. The method includes monitoring an output from the one or more of the accelerometers to determine whether a shock pulse acceleration event has been detected that exceeds a predetermined threshold. The method also includes determining that a second acceleration event associated with the accelerometers exceeds a second predetermined threshold. The method further includes disabling the thermal imaging system in response to the detected acceleration events.

24 Claims, 7 Drawing Sheets

(56) References Cited

U.S. PATENT DOCUMENTS

2009/0309203 A1* 12/2009 Seppala ............... B81B 7/0038
257/682
2010/0257743 A1 10/2010 George
2012/0001644 A1* 1/2012 Baarman .............. G01D 5/2066
324/629

OTHER PUBLICATIONS

Office Action dated May 8, 2015 for U.S. Appl. No. 13/848,517, 20 pages.
Final Office Action mailed Oct. 6, 2015 in U.S. Appl. No. 13/848,517, 17 pages.

* cited by examiner

METHOD AND SYSTEM FOR RESTRICTING APPLICATIONS FOR A FOCAL PLANE ARRAY

CROSS-REFERENCES TO RELATED APPLICATIONS

The following regular U.S. patent applications (including this one) are being filed concurrently, and the entire disclosure of the other application is incorporated by reference into this application for all purposes:

Application Ser. No. 13/848,439, filed Mar. 21, 2013, entitled "METHOD AND SYSTEM FOR RESTRICTING APPLICATIONS FOR A FOCAL PLANE ARRAY"; and Application Ser. No. 13/848,517, filed Mar. 21, 2013, entitled "METHOD AND SYSTEM FOR RESTRICTING APPLICATIONS FOR A THERMAL CAMERA".

This application claims priority to U.S. Provisional Patent Application No. 61/616,612, filed Mar. 28, 2012, entitled "METHOD AND SYSTEM FOR RESTRICTING APPLICATIONS FOR A FOCAL PLANE ARRAY," and U.S. Provisional Patent Application No. 61/616,606, filed Mar. 28, 2012, entitled "METHOD AND SYSTEM FOR RESTRICTING APPLICATIONS FOR A THERMAL CAMERA," each of which are incorporated by reference herein in their entirety.

FIELD OF THE INVENTION

The embodiments described herein relate generally to thermal imaging systems. More particularly, the embodiments relate to disabling a thermal imaging device based on detecting one or more shock pulse events.

BACKGROUND OF THE INVENTION

All objects emit infrared radiation ("IR") as a function of their temperature. Thermal imaging systems, also referred to as thermal cameras or infrared cameras, are devices that generate images or video based on infrared radiation. Using IR detectors, radiation can be collected and used to generate the thermal imaging data. Thermal imaging systems can include, for example, a thermal camera and an uncooled infrared focal plane array ("FPA"). A few examples of the many applications for infrared FPAs include missile or related weapons guidance sensors, infrared astronomy, weapon targeting, home inspection (thermography), security and surveillance, automotive object avoidance, manufacturing inspection, medical imaging, and infrared phenomenology (such as observing combustion, weapon impact, rocket motor ignition, or other events that are interesting in the infrared spectrum).

Under current United States federal regulations, the export of uncooled FPAs as well as other thermal imaging devices has been tightly controlled based in part on concerns related to the use of such FPAs in thermal weapons sights. In order to prevent the export of thermal imaging systems that could be incorporated into thermal weapons systems by foreign entities, the export of cameras that incorporate FPAs has accordingly been controlled.

SUMMARY OF THE INVENTION

The techniques described herein relate to restricting the applications or activities in which a thermal imaging system can be employed. Merely by way of example, the methods, systems, and apparatuses described herein have been applied to disabling thermal image or video output data from a thermal imaging device in response to detecting one or more acceleration events associated with one or more shock pulses. Although some embodiments relate to disabling functionality of a thermal imaging device when used for applications involving weapons systems, skilled artisans will recognize that the techniques described herein have much broader applicability.

According to one embodiment, an infrared FPA integrated with one or more accelerometers in a thermal imaging system is provided. The thermal imaging system includes a processor and a detector circuit coupled with the processor to detect acceleration events associated with one or more of the accelerometers. The thermal imaging system further includes a memory adapted to store information related to the acceleration events and a comparison circuit operable to determine whether each acceleration event exceeds a predetermined threshold, or compares temporally to known or set of known shock pulses. The thermal imaging system also includes a disable circuit adapted to disable the thermal imaging system in response to detecting one or more acceleration events that meet this criteria. A counter can also be provided to track the number of detected acceleration events and to initiate the disabling of the thermal imaging system when a predetermined number of acceleration events have been detected. In one embodiment, the thermal imaging system can be disabled by blocking one or more output signals of the thermal imager or FPA. In other embodiments, the thermal imager or FPA can be prevented from generating a useable output signal in the first place. The thermal imaging system may also disable its output at other points in the signal path as would be well understood by persons of skill in the art.

In yet other embodiments, a method of disabling a FPA integrated with one or more accelerometers in a thermal imaging system is provided. The method includes detecting a first acceleration event associated with one or more of the accelerometers, determining that the first acceleration event exceeds a first predetermined threshold, and storing information related to the first acceleration event in a memory. The method further includes detecting a second acceleration event associated with one or more of the accelerometers, determining that the second acceleration event exceeds a second predetermined threshold, and disabling the FPA in response to the first acceleration event and the second acceleration event. In one embodiment, the first predetermined threshold and the second predetermined threshold can have the same value. In other embodiments they can differ as the case may be. In any case, the method includes a tracking the number of detected acceleration events and disabling the FPA or thermal imager when a predetermined number of acceleration events have been detected.

According to other embodiments, a FPA system is provided that includes a MEMS-based microbolometer device coupled with a MEMS-based accelerometer device. The FPA system also includes a memory and a processor operable to disable the microbolometer device in response to detecting one or more shock pulse events that exceed a predetermined threshold in amplitude or intensity, or both.

According to another embodiment of the present invention, a method of disabling a thermal imaging device is provided. The method includes monitoring output from one or more accelerometers in a set of accelerometers and detecting an acceleration event associated with one or more of the set of accelerometers. The method also includes determining that the acceleration event exceeds a predetermined threshold and disabling the thermal imaging device in response to the acceleration event exceeding the predetermined threshold.

According to a specific embodiment of the present invention, a thermal imaging system is provided. The thermal imaging system includes a thermal camera and a plurality of accelerometers mechanically coupled with the thermal camera. The thermal imaging system also includes a processor operable to (1) detect a shock pulse experienced by the thermal camera exceeding a predetermined threshold and (2) disable the thermal camera in response to the detected shock pulse exceeding the predetermined threshold.

According to another specific embodiment of the present invention, a thermal imaging system is provided. The thermal imaging system includes a processor and a detector circuit coupled with the processor and configured to detect an acceleration event associated with one or more accelerometers in a set of accelerometers. The thermal imaging system also includes a comparison circuit operable to determine whether the detected acceleration event exceeds a predetermined threshold and a disable circuit adapted to disable the thermal imaging system in response to the acceleration event exceeding the predetermined threshold.

Numerous benefits are achieved by way of these techniques over conventional methods. For example, embodiments are adapted to prevent the use of thermal imaging systems in weapons-related activities or applications. This enables such a thermal imaging system to be employed in a wide variety of commercial applications while preventing undesirable use of these devices.

These and other details of embodiments along with many of their advantages and features are described in the following description, claims, and figures.

BRIEF DESCRIPTION OF THE DRAWINGS

A better understanding of at least certain embodiments of the invention can be obtained from the following detailed description in conjunction with the following drawings, in which.

DETAILED DESCRIPTION OF SPECIFIC EMBODIMENTS

Figure 1A:
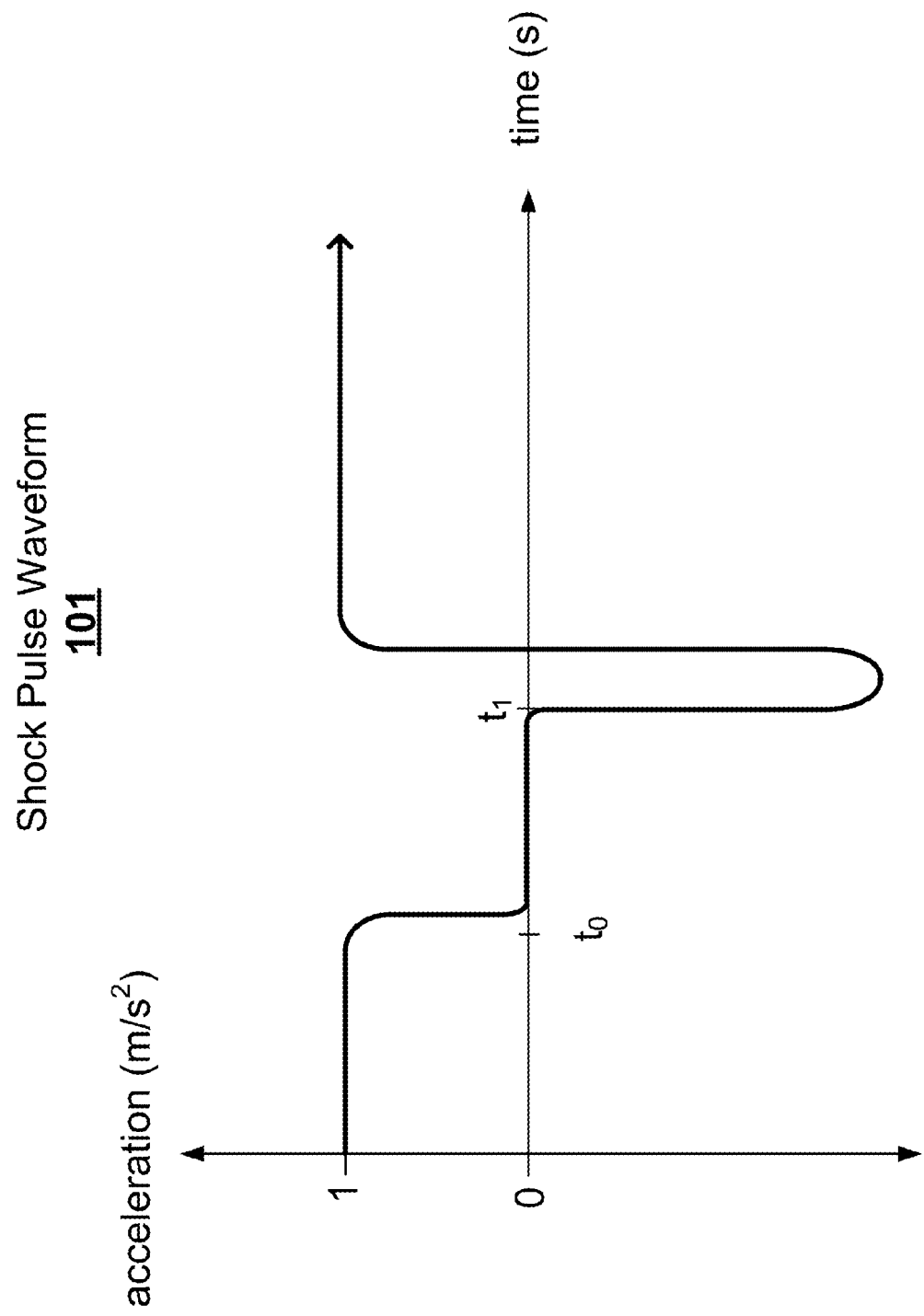
FIG. 1A depicts a graphical representation of a plot of acceleration versus time for a shock pulse event according to one example embodiment.

Throughout this description for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the described embodiments.

The systems and methods introduced herein are adapted to provide a thermal imaging system. The thermal imaging system includes a processor and a detector circuit coupled with the processor to detect acceleration signals or events associated with one or more accelerometers. In other embodiments, the processor can be used to perform the detecting function, or the detector circuit can be built into the processor. The thermal imaging system includes a memory adapted to store information related to the acceleration events and a comparison circuit operable to determine whether each acceleration event compares to or exceeds a predetermined threshold by comparing each detected acceleration event with a predetermined signal or threshold value stored in memory. The threshold value may be one of amplitude, intensity, or duration of the detected acceleration event, or any combination of these. The thermal imaging system also includes a disable circuit adapted to disable the thermal imaging system in response to detecting one or more acceleration events that compare to or exceed one or more predetermined thresholds. This can be accomplished using a counter to track the number of detected acceleration events and to disable the thermal imaging system when a predetermined number of acceleration events have been detected.

In one embodiment, the thermal imaging system can be disabled by blocking one or more output signals of the thermal imager or FPA. In other embodiments, the thermal imager or FPA can be prevented from generating a useable output signal in the first place. For example, the thermal imager a logic value in the thermal imager or FPA can be reset such that it deactivates the video functionality in a semi-permanent way. Thus, the thermal imager or FPA would have to be reprogrammed to switch back the logic value to allow for normal operation to continue. The thermal imager or FPA can be implemented any number of ways that are well known in the art such as, for example, a Field Programmable Gate Array ("FPGA"), programmable logic device ("PLD"), applications specific integrated circuit ("ASIC"), system-on-a-chip ("SoC"), custom circuitry, or any combinations or equivalents thereof. Persons of skill in the art would appreciate that any number of different logic arrangements can be provided to accomplish the disabling of the thermal imager or FPA devices.

In yet other embodiments, a method of disabling an infrared FPA integrated with one or more accelerometers in a thermal imaging system is provided. The method includes detecting a first acceleration event associated with one or more of the accelerometers, determining that the first acceleration event exceeds a first predetermined threshold, and storing information related to the first acceleration event in a memory. The method further includes detecting a second acceleration event associated with one or more of the accelerometers, determining that the second acceleration event exceeds a second predetermined threshold, and disabling the FPA in response to the first acceleration event and the second acceleration event. In one embodiment, the first predetermined threshold and the second predetermined threshold can have the same value. In other embodiments they can differ as the case may be. In any case, the method can further include tracking the number of detected acceleration events and disabling the FPA or thermal imager when a predetermined number of acceleration events have been detected.

As used herein, a "shock pulse" (or shock wave) is a type of propagating disturbance. Like an ordinary wave, it carries energy and can propagate through a medium or an electromagnetic field. Shock waves are characterized by an abrupt, nearly discontinuous change in the characteristics of the medium. Across a shock pulse there is an extremely rapid rise in pressure, temperature, and density. A shock pulse travels through most media at a higher speed than an ordinary wave, but the energy of a shock wave dissipates relatively quickly with distance. Thus, a shock wave can be detected by circuitry adapted to detect a rapid rise in pressure, temperature, or acceleration, or any combination of these. For instance, a shock pulse can be detected using an accelerometer. As used herein, an "accelerometer" is a device that measures acceleration. The acceleration measured by an accelerometer is not necessarily the rate of change of velocity in a coordinate system. Instead, an accelerometer measures the acceleration associated with the phenomenon of weight experienced by any mass at rest in the frame of reference of the accelerometer device. For example, an accelerometer at rest on the surface of the earth will measure an acceleration of 1 $g=9.81$ m/s$^2$ straight upwards due to its weight. By contrast, accelerometers in free fall or at rest in outer space will measure zero. Accelerometers have multiple applications in industry and science.

FIG. 1A depicts a graphical representation of a plot of acceleration versus time for a shock pulse event according to one example embodiment. A shock pulse associated with a gunfire event has a very high, very short acceleration. As an example, a shock pulse can be in the 1-2 millisecond range in duration and characterized by an acceleration greater (e.g., hundreds of times greater) than acceleration due to gravity. Referring to FIG. 1A, the shock pulse waveform 101 has a maximum amplitude of less than zero g, for example, and can have an absolute value greater than 1 g, greater than 5 g, greater than 10 g, greater than 20 g, greater than 50 g, or the like. As described herein, a processor can use outputs from one or more accelerometers to measure the acceleration curve as a function of time. The processor can sense the shock pulse and determine that the amplitude of the shock pulse exceeds a predetermined threshold in intensity (e.g., greater than 5 g) and that the duration of the shock pulse is less than another predetermined threshold in time (e.g., less than 1000 ms). Systems described herein are able to distinguish between shock events from gunfire and other types of shock events such as a shock event that occurs when the thermal camera is dropped. In some embodiments, the number of shock events exceeding the threshold is stored and used in the disabling process (i.e., disabling the camera after a predetermined number of gunfire events).

Figure 1B:
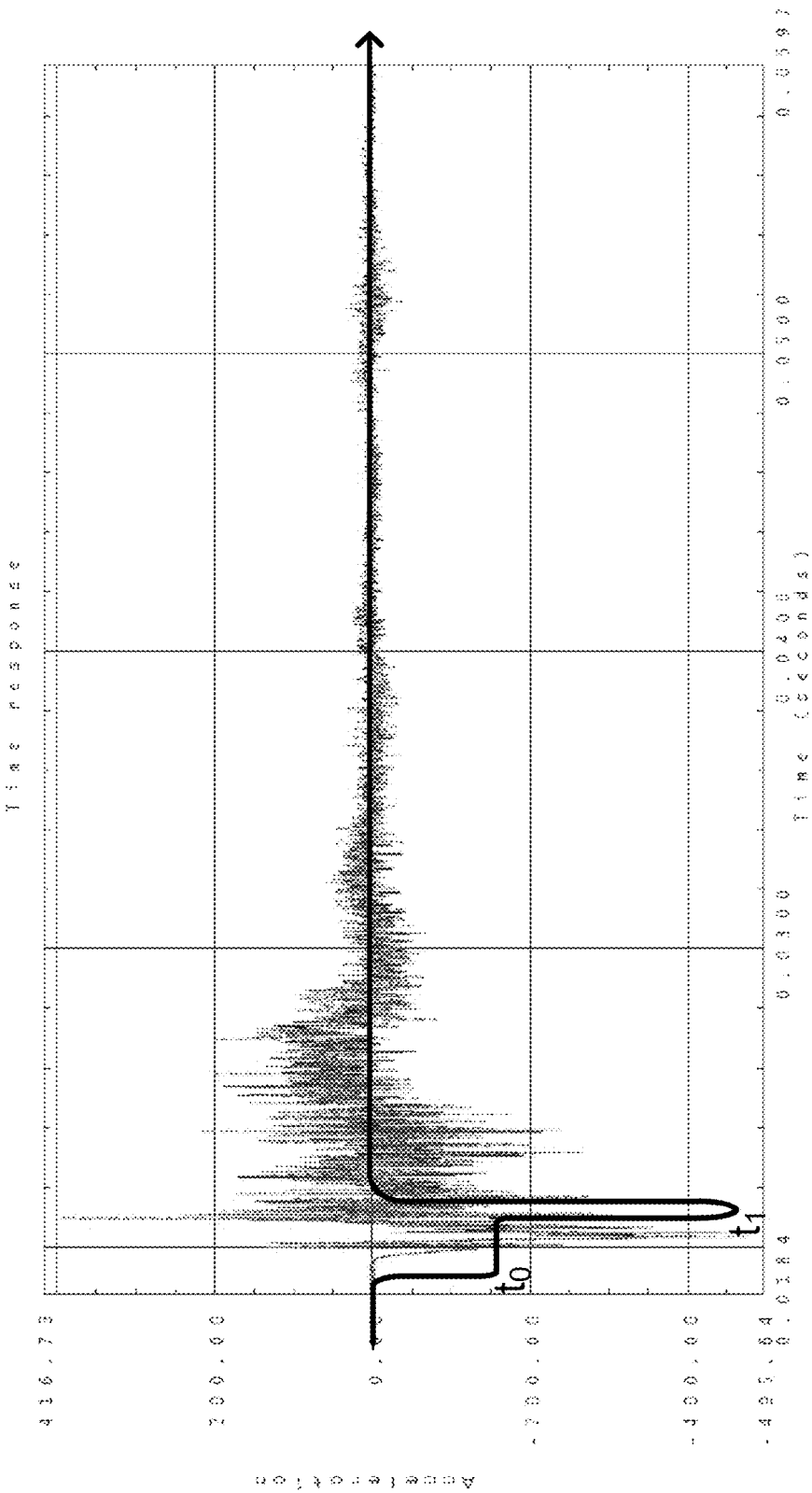
FIG. 1B depicts a graph of acceleration versus time for an empirically observed shock pulse event according to one example embodiment.

The firing of the gun produces an acceleration in a direction substantially parallel to the muzzle of the gun. It also produces an acceleration in the other axes. For a gun sight mounted on the gun and having an imaging device such as an FPA oriented with the imaging surface normal to the muzzle of the gun, the acceleration detected would be in a direction substantially normal to the imaging device. Since the firing of a gun produces an acceleration in the other axes as well, those could also be detected and could be useful in disabling the thermal imager. Although some implementations are discussed in terms of preventing use of a thermal imager in a thermal sight in which the imaging plane of the thermal imager is normal to the optical axis of the thermal sight, embodiments are not limited to this particular implementation. In other embodiments, the use of a thermal imager could be prevented in thermal sights having folding optics which are utilized to redirect the optical axis along a direction not aligned with the gun muzzle, for example, at a right angle to the gun muzzle. FIG. 1B depicts an empirical graph of acceleration versus time for an observed shock pulse event according to one example embodiment. Here the shock pulse waveform 101 is overlaid onto an observed shock pulse in experimental testing. As can be seen, the shock pulse has a very high, very short acceleration profile.

According to at least certain embodiments, methods and systems are utilized to prevent the use of FPAs in applications related to weapons systems. Utilizing the methods and systems described herein, FPAs can be rendered inoperative when utilized in conjunction with firing a weapon of some sort based on detecting shock pulses emitted from the muzzle of a weapon during firing. As an example, embodiments can be utilized to disable an imaging system in response to detection of one or more shock pulses from a gunshot or similar discharge from a weapon system of some other type. This enables use of FPAs in a variety of commercial applications that pose limited or no military threat.

Figure 2A:
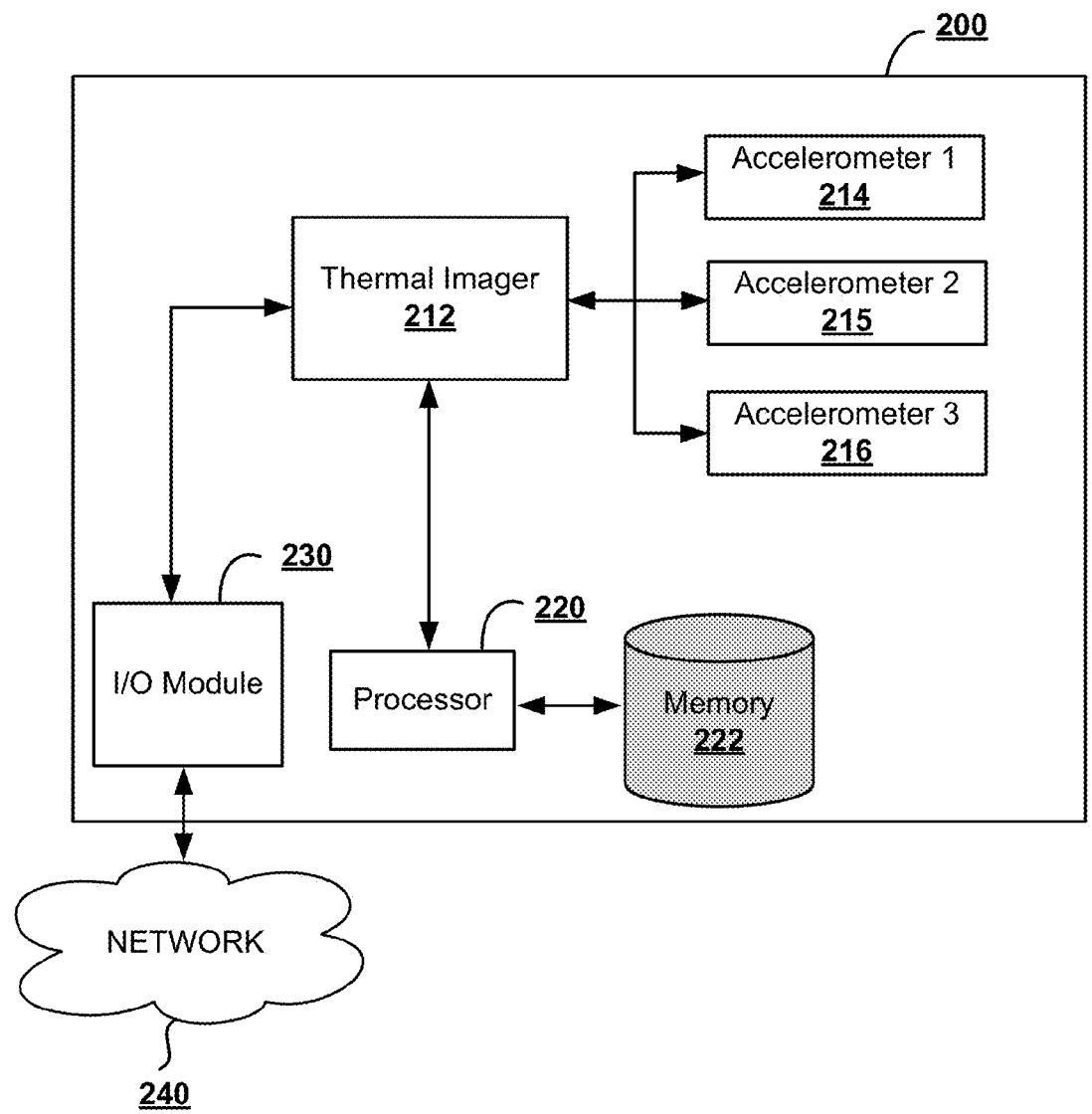
FIG. 2A depicts an example block diagram of a thermal imaging system according to one embodiment.

FIG. 2A depicts an example block diagram of a thermal imaging system according to one embodiment. In the illustrated embodiment, thermal imaging system 200 includes a thermal imager 212 that is coupled with one or more accelerometers 214, 216, and 218. In this example, three accelerometers 214-218 are utilized to provide measurement of acceleration in three dimensions although this is not required as other arrangements can be utilized. The set of accelerometers 214-218 is used to measure a shock pulse impinging upon the thermal imaging system. This enables the system to determine whether it is being used in weapons-related application such as in a thermal sight of a firearm or other weapons system. Upon determining that the thermal imager 212 is being used in one of these applications, the thermal imager 212 can be rendered inoperative, for example, by blocking its output video signal. In other embodiments, the thermal imager 212 can be disabled by biasing one or more electrodes of the thermal imager 212 to prevent it from producing a useable output signal.

In various embodiments, outputs from one of the accelerometers from the set of accelerometers 214-218 are utilized in determining whether there is a gunfire event occurring in the vicinity of the thermal imaging system 200 and thereafter disabling it. In some implementations, a predetermined number of gunfire events (e.g., gunshots) are allowed to occur before the thermal imaging system 200 is disabled. Thus, the use of the thermal imaging system is restricted to applications or activities that are not related to operation of a firearm or other weapons system.

The thermal imager 212 can be an infrared sensor such as in a SD thermal camera or in a high definition ("HD") thermal camera or other suitable thermal imager or thermal imaging system. One of ordinary skill in the art would recognize many variations, modifications, and alternatives. The system 200 also includes a processor 220 coupled with a memory 222. The processor 220 can be any processor configurable to perform the operations described herein. The processor 220 executes instructions and includes that portion of the system 200 that controls the operation of components of the system. Although not depicted in FIG. 2A, the processor 220 typically includes a control unit configured to organize data and code in the memory 222 and also to transfers data and other information between the various parts of the system 200. The processor 220 receives input data from system components including the one or more accelerometers 214-218 and the thermal imager 212, and reads from stored data and code in memory 222. In some implementations, the processor 220 is in communication with a network to receive data and provide data to the external processors including computers.

In addition, system 200 includes one or more circuits (not shown) adapted to detect a shock pulse event as well as one or more circuits for comparing the shock pulse characteristics to certain thresholds. For instance, the amplitude of a shock pulse event can be compared to an amplitude value stored in memory 222 using the comparison circuit. The detection and comparison circuits are not shown in FIG. 2A, but can be located with the set of accelerometers or within processor 220 or other parts of the systems as would be well understood by persons of skill in the art.

Although the system 200 is shown to contain only a single processor 220, the disclosed embodiment applies equally to systems that may have multiple processors. It will be evident to one of skill in the art that the various functions performed by the processors described herein can be performed by a single processor, multiple processors, or combinations thereof. In some embodiments, the processing of data, including data measured using the accelerometers, may be carried out using dedicated hardware such as an application specific integrated circuit (ASIC). In yet other embodiments, the processing may be carried out using a combination of software and hardware. As an example, such processors include dedicated circuitry, ASICs, combinatorial logic, other programmable processors, combinations thereof, or the like. Thus, processors as provided herein are defined broadly and include processors adapted to receive and process accelerometer data, store and output results, perform communications functions, or other functionality described herein.

The memory 222 represents one or more mechanisms for storing data. For example, the memory 222, also referred to as a storage device, may include read-only memory (ROM), random access memory (RAM), magnetic disk storage media, optical storage media, flash memory devices, or any other appropriate computer-readable media. Any appropriate type of storage device may be used. Although only one memory 222 is shown, multiple storage devices and multiple types of storage devices may be utilized. Further, although the system 200 is illustrated as containing the memory 222, it may be distributed across one or more other systems or networks. For example, memory 222 can be located remotely on a server or in a cloud-based computing solution.

The processor 220 and memory 222 are utilized in some embodiments to receive, process, and store data obtained from the thermal imager 210 or one or more of the accelerometers 212, 214, and 216. In an embodiment, the processor 220 receives data from all three accelerometers and processes the data to determine that an acceleration event has occurred. As an example, processor 220 can be configured to sense a shock pulse from gun fire. After a number of shock pulses exceeding a predetermined threshold number of pulses, the processor 220 can disable the thermal imager 212 functionality, thus rendering a thermal weapons sight utilizing the thermal imager inoperable. The processor may contain a disable circuit or can execute code from memory 222 to perform the disabling of the thermal imaging system 200. Accordingly, embodiments may enable thermal imaging systems to be exported overseas since their use is prevented in weapons-based applications. The system 200 also includes an input/output module (230) that provides for control of the system as well as for communication of data obtained by the system with external processor, computers, communications systems, a network 240, which may be the Internet, or the like.

Figure 2B:
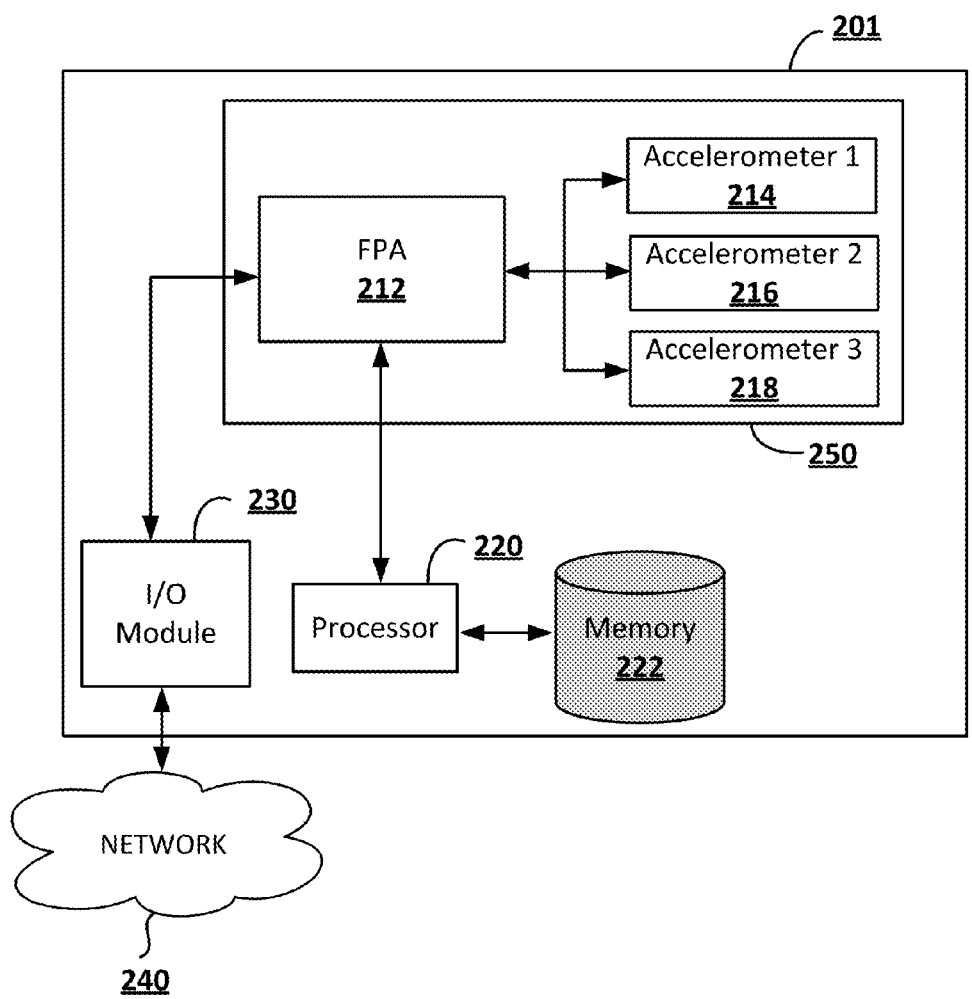
FIG. 2B depicts an example block diagram of an integrated FPA and accelerometer system according to one embodiment.

FIG. 2B depicts an example block diagram of an integrated FPA and accelerometer system. Thermal imaging system 201 includes a FPA 212 integrated with one or more accelerometers 214, 216, and 218. As illustrated, three accelerometers are utilized to provide measurement of acceleration in three dimensions although this is not required as other arrangements can be utilized. In the illustrated embodiment, the FPA 222 and accelerometers 214-218 are combined together on the same integrated circuit 250. As described more fully herein, the set of one or more accelerometers 214-218 can be used to measure a shock pulse perpendicular to the FPA 222 and in the other axes to determine whether the FPA is being used in an application related to weapons or in a thermal weapons sight application. Upon determining that the FPA is being used in one of these types of applications, the FPA 222 can be rendered inoperative, for example, by blocking a video signal output by the FPA. Outputs from an accelerometer or set of accelerometers 214-218 can be utilized to determine whether there has been a gunfire event and thereafter can disable the thermal imaging system 201. In some implementations, a predetermined number of shock pulses are permitted before the thermal imaging system is disabled. Thus, the use of the FPA 222 can therefore be restricted to activities that do not involve operation of weapons or weapons systems in near proximity to the thermal imaging system 201.

FPA 222 can be an infrared microbolometer or other suitable thermal imagers or imaging systems. A "microbolometer" is a specific type of bolometer used as a detector in a thermal camera. Infrared radiation strikes the detector material in the microbolometer, heating it, and changing its electrical resistance, which change is measured and processed into voltages which can be used to create an image. Unlike other types of infrared detecting equipment, microbolometers do not require cooling. One of ordinary skill in the art would recognize many variations, modifications, and alternatives. In one particular embodiment, the microbolometer device may include an uncooled VOx detector array that is responsive to radiation between 8 μm and 14 μm.

The system 201 also includes a processor 220 and a memory 222 as discussed above with respect to FIG. 2A. Processor 220 and memory 222 may be utilized to receive, process, and store data obtained from the FPA 222 or one or more of the accelerometers 214-218. In one embodiment, processor 220 receives data from all three accelerometers and processes it to determine whether an acceleration event has occurred that could be associated with firing of a weapon or weapons system in the near vicinity to the thermal imaging system 201. As an example, the processor can sense the shock pulse from gun fire, and, after a number of pulses exceeding a threshold, disable the FPA 222 functionality, thus rendering a thermal weapons sight utilizing the thermal imager inoperable. Accordingly, embodiments may enable systems including FPAs 222 to be exported overseas since their use in weapons-based activities is prevented by the circuitry described herein.

Upon determining that the system is being used in one of these applications, the FPA 212 can be rendered inoperative, for example, by blocking its output video signal (not shown). In other embodiments, the FPA 222 can be disabled by biasing one or more of its electrodes in such a manner as to prevent the FPA 222 from generating a useable output signal. The number of shock pulses can be counted using, for example, a counter circuit (not shown). Once a predetermined number of shock pulses has been detected that are likely to have originated from a weapons-related activity, the counter circuit can output a signal to a disable circuit (not shown) adapted to disable the FPA 222. The counter circuit and disable circuit can be located within processor 220 or can be located in other portions of the thermal imaging system 201 as would be well known by persons of skill in the art.

In some embodiments, the one or more accelerometers 214-218 can be integrated on the same integrated circuit die 250 as the infrared image device FPA 222, whereas in other embodiments, the accelerometers can be discrete components coupled with the FPA 222 through one or more intermediate circuits. In embodiments in which the accelerometers 214-218 and FPA 222 are integrated on a single integrated circuit die, they can be integrated using a micro-electro-mechanical systems ("MEMS") process along with MEMS-based accelerometers to provide shock pulse measurements in three axes using a compatible process for both elements. In some embodiments, disabling of the FPA 222 can be performed by biasing one or more electrodes of the FPA to prevent it from producing a useable output signal. Thus, some embodiments prevent the FPA from producing an output signal as a supplement to or in place of blocking the output video signal.

Data from both the FPA 222 and the accelerometers 214-218 can also be utilized to reduce "false alarms" associated with shock pulse acceleration events. As an example, if the FPA 222 has been turned off for a predetermined period of time preceding a detected acceleration event, then it is likely that the acceleration event is not associated with firing of a weapon, but instead, is more likely to be associated with dropping of the FPA or other activity unrelated to use in a thermal weapons sight. The counter circuit discussed above or the memory 222, or combination of a counter and memory, can be used to track the number of shock pulses detected. Once a certain predetermined number of shock pulse events have occurred that exceed the relevant thresholds, thermal imaging functionality can be disabled. In one implementation, the imaging functions are disabled by disabling the output video signal so that the imaging system only produced a gray screen image. Embodiments are applicable to both video and still imaging systems.

Further, the accelerometers 214-218 can be used to determine whether the system has been tampered with or otherwise compromised, and can enable the system to be disabled as a result. If one of the accelerometers becomes disabled, such a modification could be detected since normally there is 1 g of acceleration on the camera as a result of gravity and each accelerometer would detect a change in the 1 g acceleration should the accelerometers be tampered with. In addition, a three-axis accelerometer integrated with the FPA 22 can be used. Such a three-axis accelerometer enables measuring the acceleration at each accelerometer and then comparing those measurements to the measurements of acceleration in other directions from the other two accelerometers. Additionally, periodic checks of the accelerometer system can also be performed to verify that the system is working properly and provide accurate and correct data to the processor.

Figure 3A:
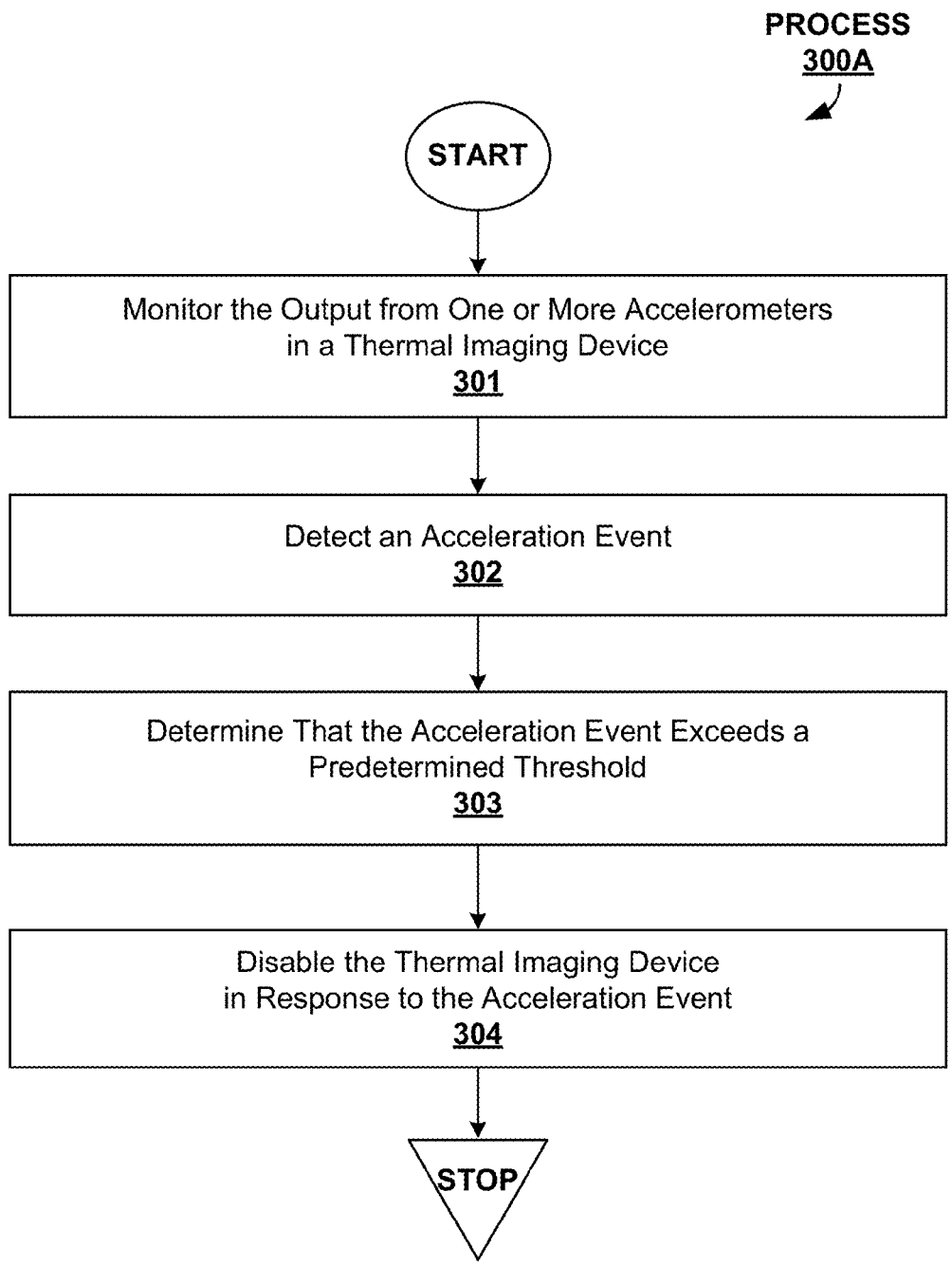
FIG. 3A depicts an example flow chart of a process of disabling a thermal imaging device in response to a shock pulse event according to one embodiment.

FIG. 3A depicts an example flow chart of a process of disabling a thermal imaging device in response to a shock pulse event according to one embodiment. Process 300A begins by monitoring, using a processor, outputs from one or more accelerometers (operation 301). The process 300A continues at operation 302 where an acceleration event is detected. It is then determined whether the acceleration event exceeds a predetermined threshold (operation 303). If so, the thermal imaging device is disabled in response to the acceleration event (operation 304). In one implementation, the predetermined threshold is an amplitude value that is compared to the amplitude of the detected shock pulse. In other embodiments, other parameters can be used to compare the relative intensity of the detected pulse. In other implementations, multiple thresholds may be used and their value may vary as appropriate to the particular application. This concludes process 300A according to one example embodiment.

It should be appreciated that the specific steps illustrated in FIG. 3A provide a particular method of disabling a thermal imaging device according to an embodiment of the present invention. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 3B:
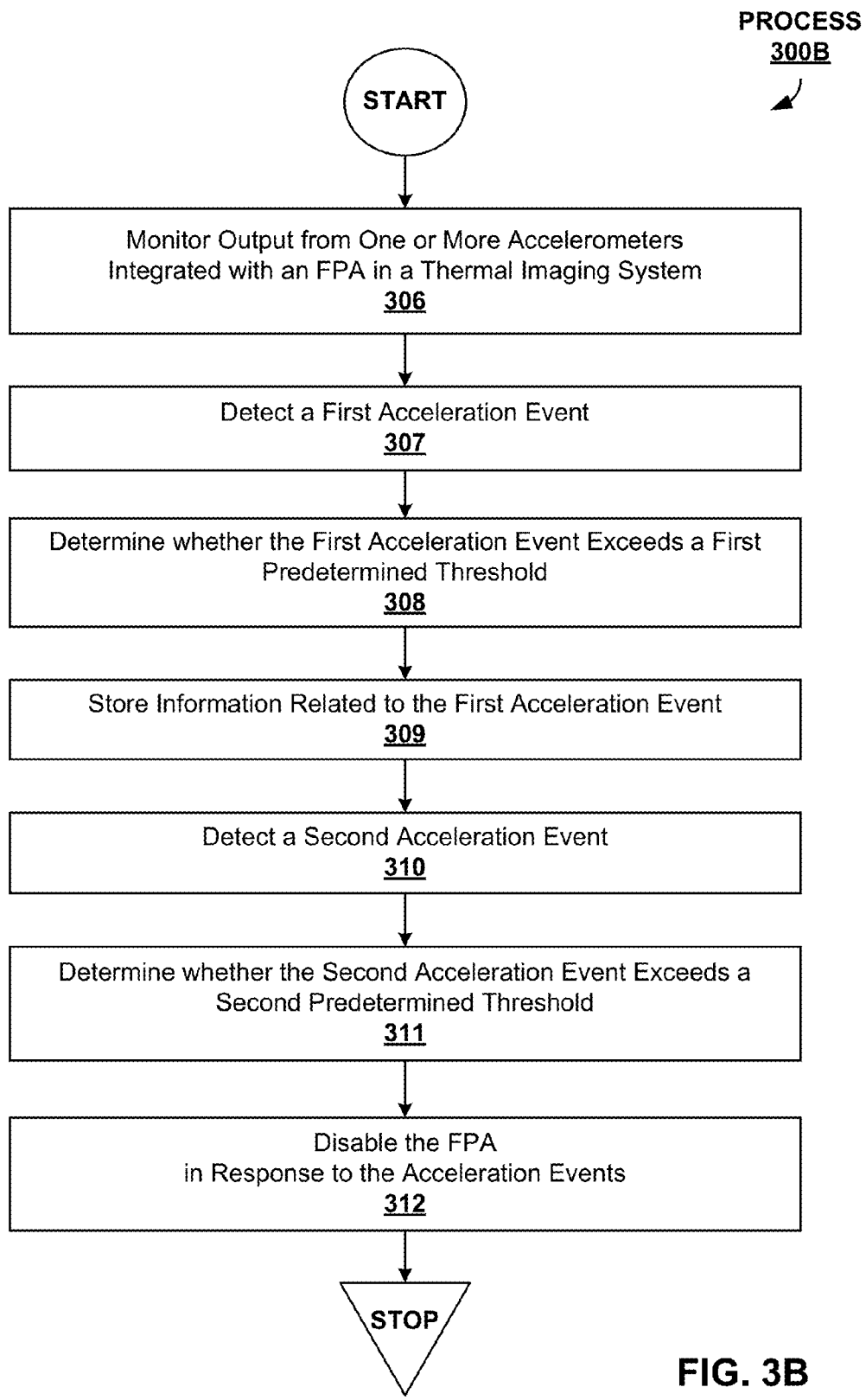
FIG. 3B depicts an example flow chart of a process of disabling an FPA in response to one or more shock pulse events according to one embodiment.

FIG. 3B depicts an example flow chart of a process of disabling an FPA in response to one or more shock pulse events according to one embodiment. Process 300B begins by monitoring, using a processor, outputs from one or more accelerometers (operation 306) integrated with an FPA in a thermal imaging system. The process continues at operation 307 where an acceleration event is detected by one or more of the accelerometers. It is then determined whether the acceleration event exceeds a first predetermined threshold (operation 308) and then storing information related to the first acceleration event in a memory (operation 309). The method further includes detecting a second acceleration event by one or more of the accelerometers (operation 310) and determining that the second acceleration event exceeds a second predetermined threshold (operation 311). If so, the FPA can be disabled in response to the acceleration event (operations 312). In some implementations, the first predetermined threshold and the second predetermined threshold can be the a same value. In other implementations, the threshold values can vary as appropriate to the particular application. For instance, the threshold values can be an amplitude value that is compared to the amplitude of the detected shock pulse. In other cases, it can be a time value that is compared to the duration of the detected shock pulse. Or it can be a combination of these threshold values that triggers the system to disable itself. This concludes process 300B according to one example embodiment.

It should be appreciated that the specific steps illustrated in FIG. 3B provide a particular method of disabling an FPA according to an embodiment of the present invention. Other sequences of steps may also be performed according to alternative embodiments. For example, alternative embodiments of the present invention may perform the steps outlined above in a different order. Moreover, the individual steps illustrated in FIG. 3B may include multiple sub-steps that may be performed in various sequences as appropriate to the individual step. Furthermore, additional steps may be added or removed depending on the particular applications. One of ordinary skill in the art would recognize many variations, modifications, and alternatives.

It should be appreciated that the specific operations illustrated in FIGS. 3A-3B depict a particular process of disabling an FPA according to one embodiment. Other sequences of operations may also be performed in alternative embodiments. For example, alternative embodiments may perform the operations outlined above in a different order. Moreover, the individual operations may include multiple sub-steps that may be performed in various sequences as appropriate and additional operations may be added or removed depending on the particular applications. One of ordinary skill in the art would recognize the many possible variations, modifications, and alternatives.

Although some embodiments of the present invention are discussed in relation to restriction applications for thermal cameras and FPAs, embodiments are not limited to the particular implementations discussed herein. In some alternative embodiments, other imaging devices are utilized and the thermal cameras and FPAs can be interchanged as appropriate to the particular applications. One of ordinary skill in the art would recognize many variations, modifications, and alternatives. Provided below are descriptions of some devices (and components of those devices) that may be used in the systems and methods described above. These devices may be used, for instance, to receive, transmit, process, and/or store data related to any of the functionality described above. As will be appreciated by one of ordinary skill in the art, the devices described below may have only some of the components described below, or may have additional components.

Figure 4:
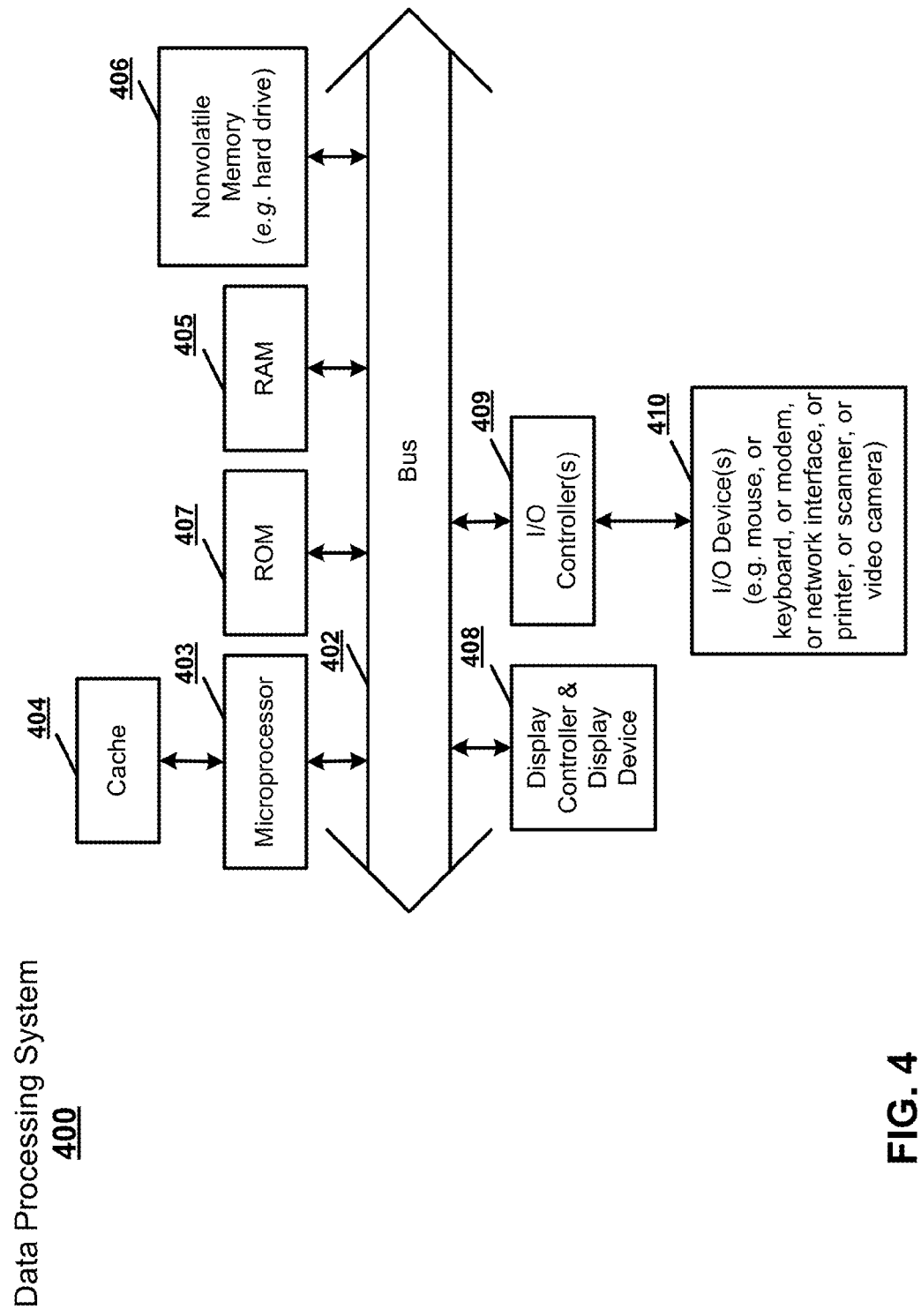
FIG. 4 depicts an example block diagram of a data processing system upon which the disclosed embodiments may be implemented.

FIG. 4 depicts an example block diagram of a data processing system upon which the disclosed embodiments may be implemented. Embodiments of the present invention may be practiced with various computer system configurations such as hand-held devices, microprocessor systems, microprocessor-based or programmable user electronics, minicomputers, mainframe computers and the like. The embodiments can also be practiced in distributed computing environments where tasks are performed by remote processing devices that are linked through a wire-based or wireless network. FIG. 4 shows one example of a data processing system, such as data processing system 400, which may be used with the present described embodiments. Note that while FIG. 4 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 4 may, for example, a personal computer (PC), workstation, tablet, smartphone or other hand-held wireless device, or any device having similar functionality.

As shown, the data processing system 401 includes a system bus 402 which is coupled to a microprocessor 403, a Read-Only Memory (ROM) 407, a volatile Random Access Memory (RAM) 405, as well as other nonvolatile memory 406. In the illustrated embodiment, microprocessor 403 is coupled to cache memory 404. System bus 402 can be adapted to interconnect these various components together and also interconnect components 403, 407, 405, and 406 to a display controller and display device 408, and to peripheral devices such as input/output ("I/O") devices 410. Types of I/O devices can include keyboards, modems, network interfaces, printers, scanners, video cameras, or other devices well known in the art. Typically, I/O devices 410 are coupled to the system bus 402 through I/O controllers 409. In one embodiment the I/O controller 409 includes a Universal Serial Bus ("USB") adapter for controlling USB peripherals or other type of bus adapter.

RAM 405 can be implemented as dynamic RAM ("DRAM") which requires power continually in order to refresh or maintain the data in the memory. The other nonvolatile memory 406 can be a magnetic hard drive, magnetic optical drive, optical drive, DVD RAM, or other type of memory system that maintains data after power is removed from the system. While FIG. 4 shows that nonvolatile memory 406 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 400, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

What is claimed is:

1. A method of disabling a focal plane array ("FPA") integrated with a set of one or more accelerometers in a thermal imaging device, the method comprising:

detecting a first acceleration event associated with one or more of the set of accelerometers;

determining that a first amplitude of the first acceleration event exceeds a first predetermined threshold, wherein the first predetermined threshold is 5 times an acceleration due to gravity;

storing information related to the first acceleration event in a memory;

detecting a second acceleration event associated with one or more of the set of accelerometers;

determining that a second amplitude of the second acceleration event exceeds a second predetermined threshold; and disabling the FPA in response to the first amplitude of the first acceleration event exceeding the first predetermined threshold and the second amplitude of the second acceleration event exceeding the second predetermined threshold.

2. The method of claim 1 further comprising:
determining that a first duration of the first acceleration event is less than a third predetermined threshold, wherein the third predetermined threshold is 1000 ms; and
determining that a second duration of the second acceleration event is less than a fourth predetermined threshold; and
wherein disabling includes disabling the FPA in response to:
the first amplitude of the first acceleration event exceeding the first predetermined threshold,
the first duration of the first acceleration event being less than the third predetermined threshold,
the second amplitude of the second acceleration event exceeding the second predetermined threshold, and
the second duration of the second acceleration event being less than the fourth predetermined threshold.

3. The method of claim 1 wherein disabling includes:
counting a number of detected acceleration events that exceed a predetermined threshold; and
disabling the FPA when a predetermined number of acceleration events have been detected as having amplitudes that exceed the predetermined threshold.

4. The method of claim 1 wherein the FPA and the one or more accelerometers are built onto a single integrated circuit die.

5. The method of claim 1 wherein disabling the FPA comprises blocking one or more output signals of the FPA.

6. The method of claim 1 wherein disabling the FPA comprises biasing one or more electrodes of the FPA to prevent it from producing a useable output signal.

7. The method of claim 1 wherein the set of one or more accelerometers includes three accelerometers, each positioned orthogonal to one another to detect acceleration events in three dimensions.

8. The method of claim 1 wherein the first predetermined threshold and the second predetermined threshold are a same value.

9. The method of claim 1 wherein the FPA comprises a microbolometer device.

10. The method of claim 9 wherein the microbolometer device comprises an uncooled detector array.

11. A focal plane array ("FPA") integrated with a set of one or more accelerometers in a thermal imaging system comprising:
a processor coupled to the FPA;
a detector circuit configured to detect a first acceleration event associated with one or more of the set of accelerometers and a second acceleration event associated with one or more of the set of accelerometers;
a comparison circuit operable to determine whether (1) a first amplitude of the first acceleration event exceeds a first predetermined threshold, wherein the first predetermined threshold is 5 times an acceleration due to gravity and (2) a second amplitude of the second acceleration event exceeds a second predetermined threshold;
a memory coupled to the processor and adapted to store information related to the first and second acceleration events; and
a disable circuit adapted to disable the FPA in response to the first amplitude of the first acceleration event exceeding the first predetermined threshold and the second amplitude of the second acceleration event exceeding the second predetermined threshold.

12. The FPA of claim 11 wherein the FPA is disabled by blocking one or more output signals of the FPA.

13. The FPA of claim 11 wherein the FPA is disabled by preventing it from generating a useable output signal.

14. The FPA of claim 11 wherein the comparison circuit is further operable to determine whether (3) a first duration of the first acceleration event is less than a third predetermined threshold, wherein the third predetermined threshold is 1000 ms and (4) a second duration of the second acceleration event is less than a fourth predetermined threshold, and wherein the disable circuit is adapted to disable the FPA in response to:
the first amplitude of the first acceleration event exceeding the first predetermined threshold,
the first duration of the first acceleration event being less than the third predetermined threshold,
the second amplitude of the second acceleration event exceeding the second predetermined threshold, and
the second duration of the second acceleration event being less than the fourth predetermined threshold.

15. The FPA of claim 11 further comprising a counter operable to:
track a number of detected acceleration events having amplitudes exceeding a predetermined threshold; and
wherein the disable circuit is adapted to disable the FPA when a predetermined number of acceleration events have been detected as having amplitudes that exceed the predetermined threshold.

16. The FPA of claim 11 wherein the FPA comprises a microbolometer device.

17. The FPA of claim 16 wherein the microbolometer device comprises an uncooled detector array.

18. The FPA of claim 11 wherein the set of accelerometers includes three accelerometers, each positioned orthogonal to one another to detect acceleration events in three dimensions.

19. A focal plane array ("FPA") system comprising:
a MEMS-based microbolometer device;
a MEMS-based accelerometer device;
a memory; and
a processor coupled to the memory and operable to disable the MEMS-based microbolometer device in response to determining that one or more detected shock events have amplitudes that exceed a predetermined threshold, wherein the predetermined threshold is 5 times an acceleration due to gravity.

20. The FPA system of claim 19 wherein the MEMS-based microbolometer device and the MEMS-based accelerometer device are built onto a single integrated circuit die.

21. The FPA system of claim 19 wherein disabling the FPA comprises blocking one or more output signals from the FPA.

22. The FPA system of claim 19 wherein the MEMS-based microbolometer device comprises an uncooled detector array.

23. The FPA system of claim 19 wherein the MEMS-based accelerometer device comprises a set of three accelerometers.

24. The FPA system of claim 19 wherein the processor is further operable to disable the MEMS-based microbolometer device in response to determining that one or more detected shock events have durations that are less than a second predetermined threshold, wherein the second predetermined threshold is 1000 ms.

* * * * *